(No Model.) 2 Sheets—Sheet 2.

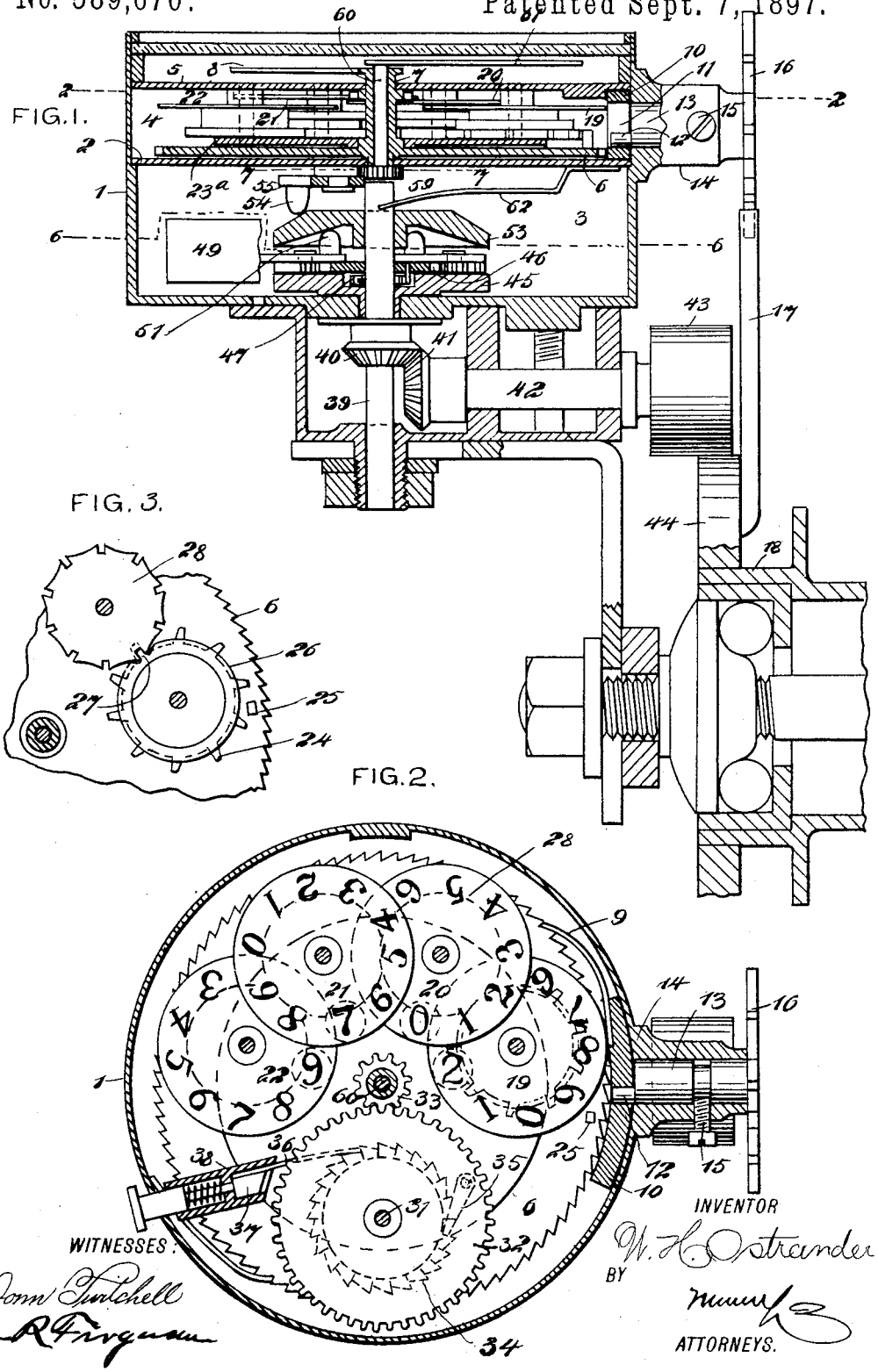

W. H. OSTRANDER.
COMBINED SPEED INDICATOR AND CYCLOMETER.

No. 589,670. Patented Sept. 7, 1897.

WITNESSES:
INVENTOR
W. H. Ostrander
BY
ATTORNEYS.

United States Patent Office.

WILLIS H. OSTRANDER, OF BOSTON, MASSACHUSETTS, ASSIGNOR TO HIMSELF, AND ANTONIO RASINES AND LOUIS H. NEWTON, OF NEW YORK, N. Y.

COMBINED SPEED-INDICATOR AND CYCLOMETER.

SPECIFICATION forming part of Letters Patent No. 589,670, dated September 7, 1897.

Application filed August 28, 1896. Serial No. 604,159. (No model.)

*To all whom it may concern:*

Be it known that I, WILLIS H. OSTRANDER, of Boston, in the county of Suffolk and State of Massachusetts, have invented a new and Improved Combined Speed-Indicator and Cyclometer, of which the following is a full, clear, and exact description.

The object of this invention is to provide a simple device for indicating the speed and at the same time registering the distance covered by a vehicle—such, for instance, as a bicycle, wagon, steam-engine, or a vessel.

The invention comprises a centrifugal-operating governor adapted to throw an indicator-hand a distance over the dial corresponding to the speed at which the vehicles travel.

I will describe a device as embodying my invention, and then point out the novel features in the appended claims.

Reference is to be had to the accompanying drawings, forming a part of this specification, in which similar characters of reference indicate corresponding parts in all the views.

Figure 4:
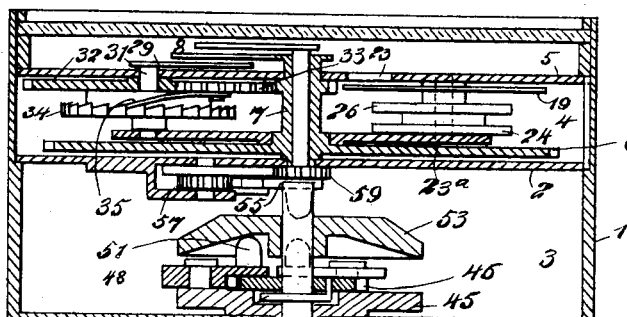
Figure 7:
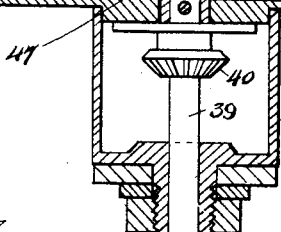
Figure 5:
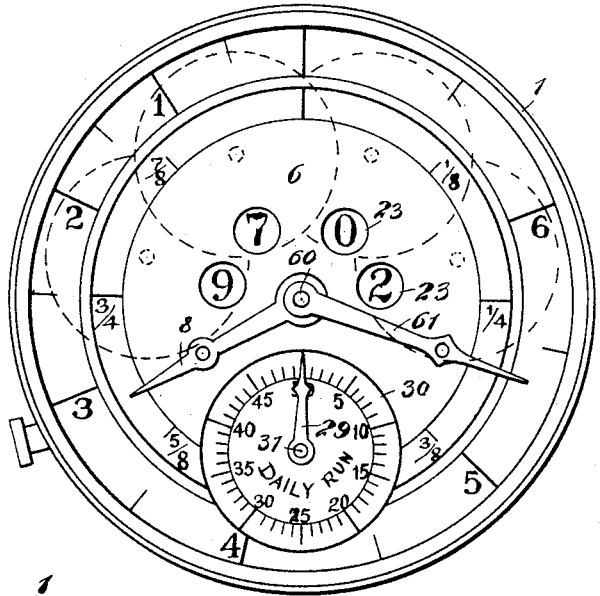
Figure 6:
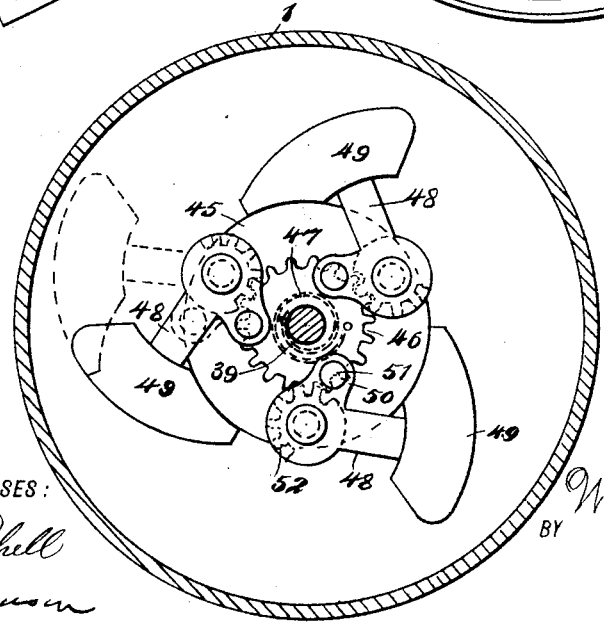

Figure 1 is a vertical section of a speed-indicator and cyclometer embodying my invention. Fig. 2 is a section on the line 2 2 of Fig. 1. Fig. 3 is a plan view, on an enlarged scale, showing a portion of the device. Fig. 4 is a section at right angles to Fig. 1. Fig. 5 is a plan view of the complete device. Fig. 6 is a section on the line 6 6 of Fig. 1, and Fig. 7 is a section on the line 7 7 of Fig. 1.

The invention comprises a casing 1, of suitable material—such, for instance, as metal—and this casing 1 is divided by a horizontal partition 2, forming a lower chamber 3 and an upper chamber 4. The upper wall of the chamber 4 is formed by a dial 5, having marks on it suitably numbered for indicating speed and also provided with openings through which figures on distance-indicating wheels may be seen, as will be hereinafter more fully described.

Within the chamber 4 is arranged a cyclometer consisting of a master-wheel 6, having a tubular hub portion 7 extended upward through the dial 5 and provided at its outer end with an indicating-hand 8. This wheel 6 is provided on its periphery with ratchet-teeth, with which a spring-yielding dog 9 is designed to engage to impart a step-by-step motion to said wheel. This spring-dog 9 is secured at one end to a block 10, having a movement circumferentially of and within the casing 1. The said block 10 may be guided at its upper edge in a recess formed in the lower side of the dial 5, as plainly indicated in Fig. 1. This block 10 is provided with a vertically-disposed slot 11, into which projects a wrist-pin 12 on a shaft 13, extended outward through a bearing 14 on the casing 1. The shaft 13 is held from longitudinal movement by means of a screw 15, extended through the bearing 14 and into an annular slot formed in the shaft 13. Obviously by removing the screw 15 the shaft 13 may be drawn out should the same be necessary.

At the outer end of the shaft 13 is affixed a tappet-wheel 16, consisting of a number of radially-disposed arms adapted to be engaged successively by a tappet carried by a rotary part of the vehicle. I have here shown a tappet in the form of an arm 17, attached to the hub portion 18 of a bicycle-wheel. At each rotation of the wheel the arm 17 will engage with an arm 16, and by rotating said wheel 6 it is obvious that the crank-pin 12 will cause the block 10 to move forward with a step-by-step motion, consequently imparting a step-by-step motion to the wheel 6, causing its hand 8 to move over the dial 5. Of course the forward movement of the block will only take place during one half-revolution of the wheel 16, and during the other half of the revolution of said wheel 16 the block will be caused to move backward to engage the dog 9 with a tooth of the wheel 6, immediately in the rear of the tooth first engaged.

Arranged above the wheel 6 are disks 19, 20, 21, and 22. Each of said disks has on its upper side a series of figures reading from "0" to "9," and a figure of each disk may be seen through the openings 23 in the dial. The disk 19 is moved through the space of one figure at each complete rotation of the wheel 6, the disk 20 is moved through the space of one figure at each complete rotation of the disk 19, the disk 21 is moved through the space of one figure at each complete rotation of the disk 20, and the disk 22 is moved through a similar space at each complete rotation of the disk 21. These several disks are respectively mounted to rotate on pins extending between the dial 5 and a plate 23ª, above the wheel 6 and loosely surrounding the hub of the said wheel 6.

On the spindle of the disk 19 is mounted a toothed wheel 24, the said teeth being successively engaged by a pin 25, extended upward from the wheel 6. Also mounted on the spindle of the disk 19 is a wheel 26, having a single tooth 27, adapted to engage at each complete rotation in one of a series of notches in a wheel 28, mounted on the spindle of the disk 20. The spindles of the disks 21 and 22 are provided with notched wheels like the wheel 28 and are adapted to be engaged by wheels similar to the wheel 26 upon the shaft of the preceding wheel in the train. The several disks just described are designed to register the whole distance in miles that a vehicle shall have traveled. It is desirable, however, to show or indicate the distance traveled each day. For this purpose I provide a pointer 29, adapted to travel around a small dial 30 on the upper side of the dial 5. This pointer 29 is mounted on a shaft 31, and loosely mounted on this shaft 31 is a gear-wheel 32, meshing with a pinion 33, attached to the tubular hub of the wheel 6. The relation between the size of the gear-wheel 32 and the pinion 33 is such that the wheel 6 must make several rotations to impart a full rotation to the wheel 32. On the shaft 31 is mounted a wheel 34, having peripheral ratchet-teeth and also having ratchet-teeth on its upper surface near its periphery. The ratchet-teeth on the upper surface are engaged by a spring-pawl 35, rigidly secured to the under side of the wheel 32, and the peripheral ratchet-teeth are engaged by a spring-finger 36, extended from a push-pin 37, extended through a sleeve 38 and outward through the casing 1.

By means of the spring-pawl 35 it is obvious that the wheel 34 may be rotated with the gear-wheel 32, and as said wheel 34 is rigidly mounted on the shaft 31 the pointer 29 will be moved over its dial. When it is desired to set the pointer 29 back to "0," the wheel 34 may be rotated by means of the push-pin 37 and spring-finger 36 thereon. Of course during this operation, and owing to the resiliency of the pawl 35, no rotary motion will be imparted to the wheel 32. Therefore the register on the several dials 19, 20, 21, and 22 will not be disturbed.

I have described the cyclometer in detail; but I do not claim, broadly, its construction, as it is quite similar to other cyclometers, excepting, however, the pawl or dog 9 and the crank or wrist pin for operating the same, and by means of which the wheel 6 will be rotated in the proper direction whether the wheel 6 be turned in one direction or the other.

I will now describe the mechanism for indicating the speed of a vehicle. Extending through the bottom wall of the casing 1 is a shaft 39, to which is attached a bevel-gear 40, meshing with a bevel-gear 41 on a horizontally-disposed shaft 42, having bearings in a bracket on the under side of the casing 1. To the outer end of this shaft 42 is affixed a friction-wheel 43, engaging with a friction-disk 44 on the hub 18. Mounted to rotate with the shaft 39, within the chamber 3, is a disk 45, and loosely mounted on the shaft 39 above the disk 45 is a pinion 46. A spring 47 is attached at one end to the shaft 39 and coiled around the same and has its other end attached to a pin extending downward from the pinion 46. As here shown, the upper side of the disk 45 has a recess formed in it to receive the coiled spring 47. A series of levers 48 is pivotally connected to the upper side of the disk 45. Each lever 48 has a weight 49 on its outer end, and at its inner end has a finger 50, extending substantially at right angles to the main portion of the lever, and extended upwardly from the finger 50 is a pin 51. Each lever 48 has a segment-gear 52, engaging with the pinion 46.

Mounted loosely on the shaft 39 so as to move vertically thereon is a disk 53, convexed on its under side, and against this convexed portion the pins 51 engage. The upper edge of this disk 53 is beveled downward and is engaged by a lug 54 on a lever 55, fulcrumed on a stud extended downward from the partition 2. This lever 55 carries a segment-gear 56, meshing with a pinion 57, attached to which is a segment-gear 58, meshing with a pinion 59 on a rod 60, extended upward through the tubular hub 7 of the wheel 6, and on the upper end of this rod 60 is secured a pointer 61, designed to travel over the dial 5.

The disk 53 is held yieldingly downward on the pins 51 by means of a spring 62, secured at one end to the partition 2 and bearing at its opposite end upon the upper side of the said disk, and a spring 63, bearing at its free end against a pin on the segment-gear 56, serves to move the lever 55 to its normal position when the vehicle is at a standstill.

In operation the centrifugal force caused by the revolution of the shaft 39, imparted from the vehicle-wheel, tends to throw the weights 49 outward, and as these weights 49 move outward it is obvious that the levers 48 will be moved on their pivots and the pins 51 will be moved toward the periphery of the disk 53, thus moving said disk upward. As the lug 54 of the lever 55 rests upon the conical or sloping cam-surface of the wheel 53, an upward movement of this wheel will force the lug outward and rock the lever 55 on its pivot. This movement of the lever, through the medium of the gearing, will rotate the rod 60, and consequently move the pointer 61 over the dial 5. Of course the greater the speed the greater the distance the pointer 61 will be moved, and upon slackening of the speed the disk 53 will be moved downward by means of the spring 62, and this downward movement of the disk 53 will cause the weights 49 to move inward and also allow the lever 55 to return toward and to its normal position, carrying the pointer 61 backward.

Having thus described my invention, I claim as new and desire to secure by Letters Patent—

1. In a speed-indicator, the combination of a disk having a conical upper surface, and pivoted revolving weights actuated from the vehicle-wheel and controlling the vertical position of said disk, with an indicating-pointer and a pivoted lever controlling the same and engaged at one end by the conical side surface of said disk to swing the end of said lever to or from the disk-center, substantially as described.

2. In a speed-indicator, the combination of a disk having conical upper and lower surfaces, spring-restrained revolving weights actuated from the vehicle-wheel and having bearing-points engaging the under conical surface of the disk to control its position, with a pivoted lever bearing at one end upon the upper conical surface of the disk and swinging radially thereof, and an indicator hand or pointer controlled by said lever, substantially as described.

3. In a speed-indicator, the combination of a disk having conical upper and lower surfaces, spring-restrained revolving weights actuated from the vehicle-wheel and having bearing-points engaging the under conical surface of the disk to control its position, with a pivoted lever bearing at one end upon the upper conical surface of the disk and swinging radially thereof, a spring holding said lever in contact with the conical surface of the disk, and a pointer controlled by said lever, substantially as described.

4. In a speed-indicator, the combination of a disk having conical upper and lower surfaces, spring-restrained revolving weights actuated from the vehicle-wheel and having bearing-points engaging the under conical surface of the disk to control its position, with a pivoted lever bearing at one end upon the upper conical surface of the disk and swinging radially thereof, and provided with a segment-gear, a pointer and a pinion connected to the pointer-pivot and controlled from the segment-gear, substantially as described.

5. In a speed-indicator, the combination of a disk having conical upper and lower surfaces, spring-restrained revolving weights actuated from the vehicle-wheel and having bearing-points engaging the under conical surface of the disk to control its position, with a pivoted lever bearing at one end upon the upper conical surface of the disk and swinging radially thereof and provided with a segment-gear, a spring holding said lever in contact with the conical cam-surface of the disk, a pointer and a pinion connected to the pointer-pivot and controlled from said segment-gear, substantially as described.

6. The combination with a casing, of a cyclometer consisting of a series of rotary parts, one of said rotary parts having a tubular hub, a rod mounted to rotate in said tubular hub, a pointer carried by said rod and movable over a dial in the casing, a shaft extended through the lower wall of the said casing, means for operating said shaft from the rotary part of a vehicle, a disk mounted on said shaft within the casing, weighted levers pivoted on said disk, a pinion loosely mounted on the shaft, a spring connection between the shaft and pinion-segment, gears on the weighted levers meshing with said pinion, pins carried by said levers, a disk loosely mounted on said shaft, said disk being convexed on its under side, a spring bearing with its free end upon said disk, and means operated by said disk for rotating the rod extending through the tubular hub, substantially as specified.

7. A cyclometer, comprising a wheel having a tubular hub, a rod mounted to rotate in said tubular hub, a pointer on the outer end of said rod movable over a dial, a pinion on the inner end of said rod, a segment-gear engaging with said pinion, a pinion carried by said segment-gear, a fulcrumed lever having a segment-gear engaging with said last-named pinion, a shaft adapted to be operated by a rotary part of a vehicle, weighted levers carried by a disk rigidly secured to said shaft, a disk loosely mounted on the shaft and convexed on its under side, pins on the weighted levers engaging said convexed under side, and a lug extended from the lever having a segment-gear engaging with the beveled upper edge of the said loosely-mounted disk, substantially as specified.

WILLIS H. OSTRANDER.

Witnesses:
 A. A. HOPKINS,
 C. R. FERGUSON.